United States Patent [19]

Slicer

[11] Patent Number: 4,866,216
[45] Date of Patent: Sep. 12, 1989

[54] METHOD AND APPARATUS FOR SEALING ELECTRICAL BUSBAR CORNER

[75] Inventor: Allen E. Slicer, Brookville, Ind.

[73] Assignee: Square D Company, Palatine, Ill.

[21] Appl. No.: 160,627

[22] Filed: Feb. 26, 1988

[51] Int. Cl.⁴ .............................................. H02G 5/06
[52] U.S. Cl. ................................... 174/71 B; 29/530; 174/98; 277/1
[58] Field of Search ................... 174/68.2, 70 B, 71 R, 174/71 B, 72 R, 72 B, 72 C, 87, 88 B, 97, 98, 101; 439/114, 210, 212, 213; 361/378; 29/530; 277/1; 52/239; 285/179, 183, 294, 373, 419; 403/205, 231, 403

[56] References Cited

U.S. PATENT DOCUMENTS

| 266,483 | 10/1882 | Kruesi | 174/71 R X |
| 366,173 | 7/1887 | Kruesi | 174/71 R X |
| 835,504 | 11/1906 | Edwards et al. | 285/179 X |
| 2,146,067 | 2/1939 | Graham | 285/373 |
| 3,287,487 | 11/1966 | Fehr, Jr. | 174/71 B |

FOREIGN PATENT DOCUMENTS

| 1519915 | 2/1968 | France | 439/210 |
| 4468 | of 1898 | United Kingdom | 285/179 |
| 631976 | 11/1947 | United Kingdom | 174/71 R |

Primary Examiner—Laramie E. Askin
Attorney, Agent, or Firm—Thomas B. Lindgren; Jose W. Jimenez

[57] ABSTRACT

A busbar corner housing includes outer and inner side walls secured to one another through flanges spaced from the corner bend. This leaves opposed openings that are substantially closed by plate-like corner covers. Each corner cover has a channel that conforms to the configuration of the outer and inner side walls and engages and abuts against the side walls. Each corner cover also includes a passage through which silicone caulking material can be forced to fill the spaces under the corner covers with caulking material, with excess caulking material being extruded out of sliver gaps between the corner covers and side walls to fill the sliver gaps and seal the housing against intrusion of moisture.

11 Claims, 2 Drawing Sheets

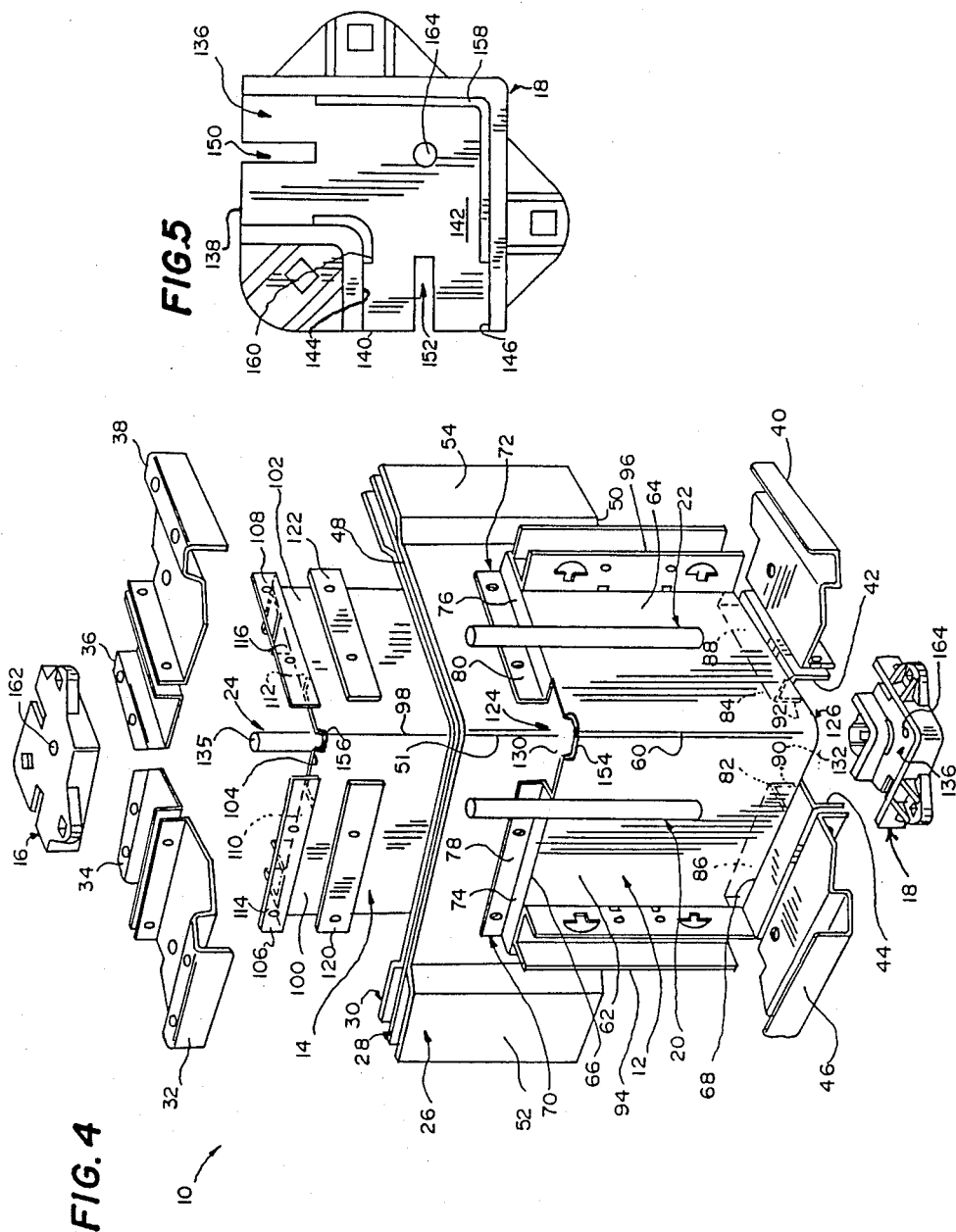

METHOD AND APPARATUS FOR SEALING ELECTRICAL BUSBAR CORNER

BACKGROUND OF THE INVENTION

This invention relates to busways enclosing busbar conductors in metal housings for carrying high current electrical power and particularly relates to forming an elbow for said housing to seal the busbar or busbars against intrusion of moisture at a bend, such as a ninety degree bend, in the busbars.

Known busway systems furnish runs of busbars from sources such as power transformers through plant buildings to distribute medium voltage power to high current draw devices such as motors. The busways typically present a rectangular cross-sectional housing made of sheet metal such as steel, aluminum or stainless steel. Inside the busways insulators support and space the busbars, in phase, from one another and the enclosure walls. In some installations, the busbars are wrapped in insulation material and abut the walls of the busways.

For straight runs, the busway walls include simple elongate flanges used to join the walls together. For corner or elbow joints, however, more is needed. Previously, elbow joints were formed from a pair of "L" shaped sheets of metal stock that effect housing side walls. The margins were double bent to form spacer portions and fastener portions, with the fastener portions engaging and being bolted to one another and the spacer portions spacing the enclosure side walls from one another. Gasket material between the fastener portions sealed the enclosure against intrusion of moisture. To facilitate the bending of the margins, the marginal portion of the material at the opposed corners of the bend was cut away to leave openings between the sealed fastener portions.

Previously these openings were closed by stamping four corner pieces from sheet metal and spot welding two corner pieces to each enclosure side wall, respectively, at the opposed corners of the bend. These corner pieces rested in positions substantially parallel to the enclosure side walls to extend the side walls, spacer portions and fastener portions over the openings. Gasket material placed between the corner pieces attempted to seal the corners against moisture, but often failed. The corner pieces were too flimsy to accept a separate bolt to clamp them together, and the corner pieces had to overlap the fastener portions for the spot welds. This left small sliver gaps at the edges of the fastener portions and under the corner pieces through which moisture often seeped into the enclosure. This moisture sometimes caused a short circuit between the busbars that led to unsafe conditions.

Stamping the corner pieces and spot welding them to the enclosure side walls required undesired additional manufacturing steps. The spot welding itself did not always seal the corner pieces to the enclosure walls; it sometimes left sliver gaps through which moisture could enter the enclosure.

Summary of the Invention

The invention furnishes a housing having a pair of side walls with opposed openings at the bend of the busbars. The housing substantially closes the openings with a pair of cast corner covers, one at each of the openings, overlapping the margins of the side walls at the openings. The corner covers rest substantially perpendicular to the axis of the bend and substantially normal to the planes of the housing side walls. Fasteners secure the corner covers in place and a passage in each of the corner covers facilitates forcing caulking material into the substantially closed spaces under the corner covers. Forcing the caulking material through the corner covers causes some of the caulk material to extrude out of any sliver gaps around the corner covers to seal the housing against intrusion of moisture into the housing.

A process of the invention comprises laying caulking material over the busbars and between the housing side walls before closing the opposed openings with the corner covers. This ensures covering all desired areas. The caulking material then is forced through the passages in the corner covers and into the spaces closed by the corner covers to fill the same, and excess caulking material forced into the filled spaces extrudes out of any small sliver gaps between the side walls and corner covers to seal the small sliver gaps against intrusion of moisture into the housing and to the busbars.

The housing and process of the invention reduce the cost of fabricating the housing, reduce the cost of assembling the housing to the busbars and, most important, improve the seal against moisture furnished by the housing.

In particular, the housing encloses the busbars at the bend by arranging inner and outer side walls on the sides of the busbars at and proximate the bend. The housing side walls become joined by engaging flange portions and form opposed openings at the two corners of the bend. The housing also furnishes a pair of plate-like, die-cast corner covers, one at each of the two openings, that engage over the inner and outer side walls at the opposed openings substantially to close the openings. Fasteners extend between the corner covers to secure the corner covers in place at the openings.

Each plate-like corner cover forms a channel in one surface that conforms to the geometry of the bend and that receives the margins of the inner and outer side walls substantially to close its respective opening. The channel is formed in the corner cover by opposed side surfaces and a connecting bottom surface. The bottom surface is substantially perpendicular to the longitudinal axis of the bend in the busbars and to the planes of the side walls. The side surfaces are substantially parallel to the planes of the side walls.

The edges of the side walls at the opening engage against the bottom surface while the margins of the side walls at the opening engage against the side surfaces of the channel. The margins of the side walls can include notches to facilitate bending the side walls and the corner covers can include steps of material at the bottom surfaces and side surfaces to conform with and engage the side walls along the notches.

Each corner cover also includes a passage through it, centrally aligned with the channel. A workman forces the caulking material through this passage to fill the space enclosed by the corner cover, and excess caulking material can extrude or flow out of this passage after the filling of the space to seal the passage against intrusion of moisture into the space.

The flanges include spacer portions extending from the side walls to space the side walls from one another and fastener portions extending from the spacer portions to secure the side walls to one another and seal, with a contained gasket, against moisture passage between the fastener portions. The spacer portions are substantially normal to the side walls and the fastener portions are substantially parallel to the side walls.

The corner covers each includes opposed slots centrally aligned with the channels and extending to the ends of the corner cover. These slots receive and fit around margins of the fastener portions of the flanges to obtain a better mechanical seal between the corner cover and the side walls. The bottom surface of the channel rests against the spacer portions in this position. Often, small sliver gaps will occur between the fastener portions and the corner cover at the slots and between the spacer portions and the channel bottom surface. These are at least some of the gaps intended to be sealed by the extrusion of the caulking material.

The process of the invention, in particular, arranges the side walls next to or against the busbars to form opposed openings at the bend and seals the side walls to one another at the flanges spaced from the bend. The caulking material then is laid over the busbars and between the side walls to ensure desired coverage. After the corner covers are installed, the caulking material is forced through the respective passages into the closed spaces until desired amounts extrude from the small sliver gaps between the corner covers and the side walls. A small tail of caulking material is also formed to extend from the passage of each corner cover to seal it.

BRIEF DESCRIPTION OF THE DRAWINGS

FIG. 4 is an exploded perspective view of the housing of the invention and enclosed busbars; and FIG. 5 is a plan view of a corner cover of the invention.

DESCRIPTION OF THE PREFERRED EMBODIMENT

Figure 1:
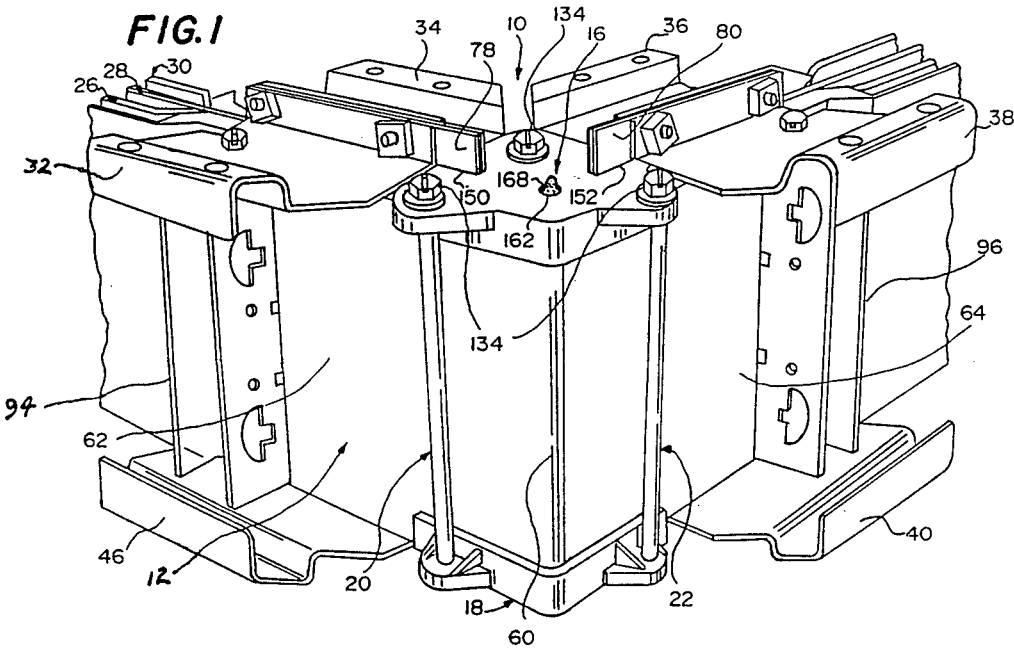
FIG. 1 is a perspective view of the assembled housing enclosing busbars.
Figure 2:
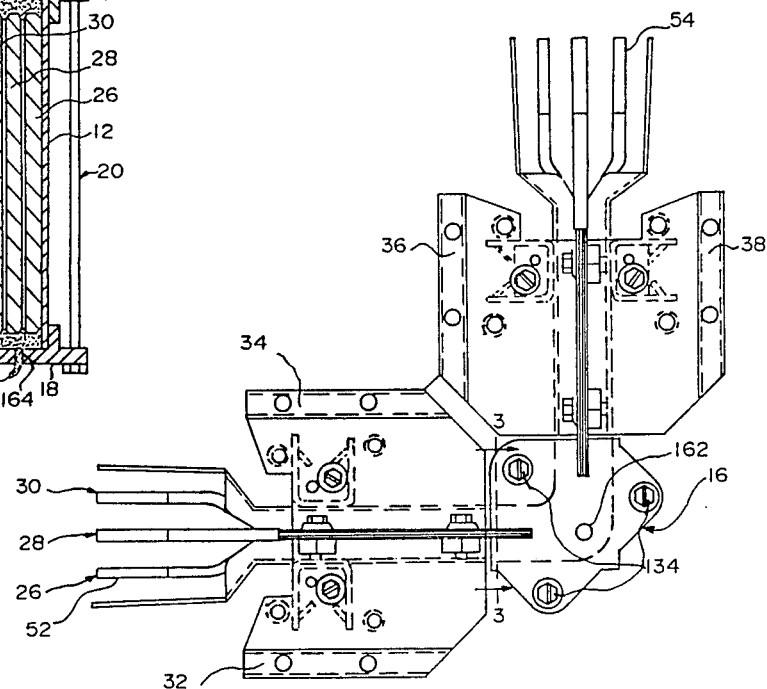
FIG. 2 is a top view of the assembled housing.

In FIGS. 1, 2 and 4, the busbar corner housing 10 of the invention comprises outer side wall 12, inner side wall 14 (not seen in FIG. 1), upper corner cover 16, lower corner cover 18, and three connecting rods 20, 22 and 24 (connecting rod 24 not seen in FIG. 1). Housing 10 also comprises three busbars 26, 28 and 30 arranged between the outer side wall 12 and inner side wall 14. Housing 10 further includes eight wing brackets 32, 34, 36, 38, 40, 42, 44 and 46, that attach to the side walls 12, 14 for connecting the corner housing 10 to straight-run housings extending away from the corner housing 10.

Busbars 26, 28, and 30 are typically made of aluminum or copper and have a shape that is thin, wide and long. Usually three-phase electrical power will be applied to the three busbars in phase, and a typical corner housing includes desired insulating materials between the busbars to insulate them one from another and between the busbars and the outer side walls to insulate them from the side walls. In this particular embodiment, the right angle corner is formed by bending the material of the busbars substantially at a 90° angle transversely of their length. The bend 51 or corner thus has a longitudinal axis extending from edge 48 to edge 50 of the busbars. Other geometries effecting a corner can be used with the invention, as will be described later. End margins 52 and 54 of each of the busbars 26, 28, and 30 serve to connect the busbars to additional lengths of busbar material extending from the corner housing 10.

Outer side wall 12 comprises a sheet of metal that is thin, long and wide and that is bent substantially at a right angle at bend 60 to form side wall portions 62 and 64. Side wall 12 has top edge margin 66 and bottom edge margin 68 extending along the length of the side wall portions 62 and 64. Top edge margin 66 includes a pair of flanges 70 and 72 that respectively present spacer portions 74 and 76, perpendicular to the planes of the side wall portions 62 and 64. Flanges 70 and 72 also include fastener portions 78 and 80 upstanding from the ends of the spacer portions 74 and 76 to be substantially parallel to the side wall portions 62 and 64.

The bottom margin 68 of side wall 12 also presents two bottom flanges 82 and 84, depicted in dashed-line outline, respectively furnishing spacer portions 86 and 88 and fastener portions 90 and 92. Flanges 82, 84 and their associated spacer and fastener portions are mirror images of the flanges 70 and 72. Outer side wall 12 also comprises angle pieces 94 and 96 secured respectively to the side wall portions 62 and 64 to rigidify the ends of the side wall portions and to facilitate assembly of the corner housing to additional busways.

Inner side wall 14 also comprises a thin, long and wide sheet of metal bent in half at bend 98 substantially to form a right angle. Bend 98 divides the inner side wall 14 into side wall portions 100 and 102. The top margin 104 furnishes two flanges 106 and 108 respectively providing spacer portions 110, 112 and fastener portions 114 and 116. The bottom margin (not shown) of inner side wall 14 also presents a pair of flanges (not shown) respectively with spacer portions and fastener portions. The spacer portions of the inner side wall 14 extend substantially perpendicular or normal to the side wall portions of side wall 14 while the fastener portions extend substantially parallel to the side wall portions of side wall 14.

Side walls 12 and 14 thus are substantially mirror images of one another.

In the assembled condition, gasket material is placed between the fastener portions of the flanges to seal against moisture intrusion. In particular, gasket 120 fits between fastener portions 78 and 114 while gasket 122 fits between fastener portions 80 and 116.

When the outer and inner side walls 12 and 14 become assembled to one another at the fastener portions of their flanges, the side walls form opposed openings 124 and 126. Opening 124 exists between the flanges 70, 72, 106 and 108 and between the top margin 66 of side wall 12 and the top margin 10 of side wall 14, at bends 60 and 98 in the outer and inner side walls and at bend 51 in the busbars 26, 28, and 30. Opening 126 exists between the like flanges and margins at the lower margins of the side walls and at the bends in the side walls and busbars. These openings leave a space 130 above the busbars 26, 28, and 30 and a space 132 below the busbar 26, 28, and 30 between the outer and inner side walls.

The housing 10 substantially closes the top opening 124 with upper corner cover 16 and substantially closes the lower opening 126 with the lower corner cover 18. Corner covers 16 and 18 become secured to one another and to the housing 10 through connecting rods 20, 22, and 24 that can be such as hollow aluminum tube stock cut to length to fit between the corner covers 16 and 18. Self-threading bolts or screws 134 having threaded shanks enter into the hollow openings 135 of the connecting rods to engage therein. Due to manufacturing imperfections and tolerance variations, sliver gaps typically occur between each corner cover 16 and 18 and the inner and outer side walls. These sliver gaps become filled with caulking material to seal the housing against intrusion of moisture by forcing the caulking material into the spaces 130 and 132 closed by the upper and lower corner covers 16 and 18.

Corner covers 16 and 18 in this embodiment are identical to one another so that a description of one is a description of the other.

Referring specifically to FIGS. 4 and 5, lower corner cover 18 comprises a die-cast zinc metal part that is substantially flat and plate-like. The material on one side of the corner cover 18 forms a channel 136. Channel 136 extends from one edge 138 to another edge 140 of the corner cover to define a right angle bend. The channel is defined by a bottom surface 142 and opposed side surfaces 144 and 146 with the bottom surface 142 extending between the side surfaces. The dimensions of the bottom surface and side surfaces and their geometric configurations are constructed and arranged to conform with and fit over the inner and outer side walls at the bends 60 and 98 with the margins of the inner and outer side walls fitting into the channel 136 substantially to close the respective openings 124 and 126.

So assembled, the top margin 66 of the outer side wall 12 abuts the channel side surface 146 while the top edge of the outer side wall 12 engages against the bottom surface 142. The top margin 104 of the inner side wall 14 abuts the side surface 144 while the top edge of inner side wall 14 engages the bottom surface 142.

Corner cover 18 also includes slots 150 and 152 extending into said corner cover respectively from end or edge 138 and end or edge 140 to be substantially centrally aligned with the channel 136. Referring back to FIG. 1, slot 150 in upper corner cover 16 receives the ends of fastener portions 78 and 114. Slot 152 in upper corner cover 16 receives the end portions of fastener portions 80 and 116. So arranged, parts of the spacer portions 74, 76, 110 and 112 abut the bottom surface 142 of channel 136 while the fastener portions of the flanges fit into the slots 150 and 152. The engagements and abutments of corner covers 16 and 18 are mirrors of one another.

To facilitate that formation of the inner and outer side walls, the margins of the side walls can include notches 154 and 156. To accommodate these notches, corner cover 18 includes an outer step of material 158 and an inner step of material 160 at the junction of the side and bottom surfaces. These steps of material are constructed and arranged to mate with the notches 154 and 156 in the inner and outer side walls. Again, sliver gaps can occur between the corner covers 16 and 18 and the flanges and the inner and outer side walls. However, notches 154 and 156 are not essential.

In the manufacturing process, an assembler encloses the busbars 26, 28, and 30 between the inner and outer side walls and secures the fastener portions to one another, with interposed gaskets, with threaded bolts or screws as desired. This leaves the indicated openings 124 and 126 and the spaces 130 and 132. The assembler then lays in caulking material, such as silicone caulking material, over the busbars 26, 28, and 30 and between the side walls 12 and 14 to ensure desired coverage within the spaces 130 and 132. The assembler then places the corner covers 16 and 18 in position over the openings and secures them in position with the threaded bolts 134 and connecting rods 20, 22 and 24. Each of the corner covers 16 and 18 also includes one passage, respectively 162 and 164 through the corner cover. The assembler takes a gun of silicone caulking material; in sequence places the tip of the gun at each opening 162, 164; and forces caulking material into the spaces 130, 132 beneath the corner covers 16 and 18. The operator then fills the spaces with caulking material until excess caulking material extrudes or is forced out of the sliver gaps between the corner covers 16, 18 and the outer and inner side walls 12, 14. This fills and seals the sliver gaps against intrusion of moisture into the housing.

Figure 3:
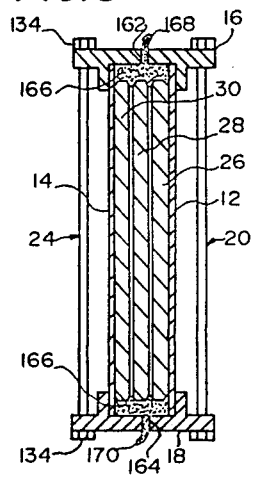
FIG. 3 is a cross-sectional view taken along the line 3—3 of FIG. 2 and in the direction indicated by the arrows.

Referring specifically to FIG. 3, the silicone caulking material 166 also expands out of the passages 162, 164 to leave small tails 168 and 170 up to fill and seal the passages against intrusion of moisture into the housing. This completes the manufacturing practice, and the busbar corner housing stands well sealed against intrusion of moisture.

The preferred embodiment depicted in the drawings is an edge-style corner housing. Flat-style corner housings also can be provided within the scope of the invention by providing similar corner covers to cover the openings at the bends. In both embodiments, the openings between the side walls are arranged around the longitudinal axis of the bend and the corner covers present plate-like members intended substantially to be normal to the longitudinal axis of the bend and to engage over the margins of the side walls.

Variations and modifications of the disclosed structures can be made while remaining within the scope of the appended claims. For example, the channel can be formed otherwise than as specifically disclosed to engage over the opening and engage and abut the side walls. Additionally, the connecting rods between the corner covers can be replaced with other fastener means to maintain the corner covers fixed in position; and the process of filling the spaces under the corner covers can be modified by such as filling the spaces with silicone caulking material only after the corner covers have been fixed in place.

I claim:

1. A housing for substantially sealing and enclosing at least one busbar at a corner bend in said busbar, said housing comprising:
   A. an outer side wall having a bend extending across the wall and adapted to be located in registration on the outside of a bend in a busbar, said other side wall having opposed edge margins, each edge margin presenting a pair of flanges spaced from one another on opposite sides of said bend;
   B. an inner side wall having a bend extending across the wall and adapted to be located in registration on the inside of a bend in a busbar, said inner side wall having opposed ends and opposed edge margins, each edge margin presenting a pair of flanges spaced from one another on opposite sides of the bend, the flanges of said inner and outer side walls being registered with one another and forming opposed openings between said inner and outer side walls and said flanges;
   C. a pair of corner covers engaging over said inner and outer side walls between said registered flanges substantially to close said openings; and
   D. fasteners securing said corner covers in place at said openings.

2. The housing of claim 1 in which each of said corner covers includes a flat, rectangular plate having a channel in one side extending from one edge of the plate to another edge of the plate, said channel being defined by a pair of opposed side surfaces and a bottom surface extending between said side surfaces, said channel having a bend conforming to the bends in said inner and outer side walls, said plate fitting over said inner and outer side walls at said bends with said inner and outer side walls engaging said plate within said channel substantially to close the associated opening.

3. The housing of claim 2 in which said edge margins of said side walls abut said bottom surface of said channel, said side surfaces of said channel overlap and rest against said inner and outer side walls and said bottom surface of said channel overlaps and rests against said flanges of said inner and outer side walls.

4. The housing of claim 3 in which said edge margins of said inner and outer side walls includes notches and each of said plates includes steps of material in said channel adjacent said side surfaces conforming to said notches.

5. The housing of claim 2 in which each of said plates includes slots extending therethrough at said one edge and said another edge, said slots being aligned substantially with the center of said channel, and said slots fitting over and engaging with said flanges on both sides of the respective opening.

6. The housing of claim 2 in which each of said plates includes a passage therethrough at said channel, said passage being adapted to pass caulk into a space defined between busbars, said inner and outer side walls, and said cover to fill the space with caulk and extrude said caulk from gaps between the parts defining said space for sealing against intrusion of moisture.

7. The housing of claim 1 in which each of said flanges includes a spacer portion extending normal from the respective side wall to space the inner and outer side walls from one another and a fastener portion extending substantially parallel to the respective side wall to secure the inner and outer side walls to one another, and including a gasket between said fastener portions of said registered flanges for sealing against intrusion of moisture.

8. The housing of claim 1 in which each of said corner covers has fasteners openings and said fasteners include rods extending between said corner covers and threaded screws fastening said rods to said corner covers.

9. An electrical busbar in combination with a housing for sealing the busbar against intrusion of moisture, comprising in combination:
   A. a busbar presenting a bend;
   B. side walls conforming to the bend of said busbar and located in registration on opposite sides of said bend in said busbar, said side walls sealingly engaging against one another at locations spaced on opposite sides of said bend and said side walls forming opposed openings located at said bend in said busbar;
   C. covers engaging said side walls at said opposed openings substantially to close said openings and leaving gaps between at least said side walls and covers; and
   D. caulking material forced into said housing between said busbar, said side walls and said covers after said busbar is assembled between said side walls, said caulking extruding out of said gaps between said side walls and said covers to seal same against intrusion of moisture.

10. A process of making a housing that seals moisture from an elongate busbar at a bend in the busbar, said process comprising:
    A. arranging a pair of side walls alongside said busbar at said bend to form opposed openings at said bend;
    B. sealing said side walls to one another at locations spaced from said bend;
    C. laying caulk material over at least said busbar through said openings;
    D. closing said openings with corner covers that furnish passages therethrough, said closing including leaving empty spaces between said side walls, corner covers, busbar and caulk material and leaving gaps between at least said side walls and said corner covers; and
    E. forcing caulk material through said passages and into said empty spaces to fill same, said forcing including extruding caulk material through said gaps.

11. A corner cover for forming a substantially moisture resistant closure for an opening between inner and outer walls of a busway housing at a bend in enclosed busbars, said corner cover comprising:
    a member having a channel in one side extending from one edge to another edge, said channel being defined by a pair of opposed side surfaces and a bottom surface extending between said side surfaces and said channel having a bend for conforming to the bend of the enclosed busbars, said member having means protruding therefrom for fastening said member to said housing from the outside of said housing and having slots extending through said member at said one edge and said another edge, said slots being aligned substantially with the center of said channel.

* * * * *